United States Patent
Thuresson et al.

(10) Patent No.: US 11,795,318 B2
(45) Date of Patent: *Oct. 24, 2023

(54) COMPOSITION

(71) Applicant: DELTA OF SWEDEN AB, Halmstad (SE)

(72) Inventors: Staffan Thuresson, Halmstad (SE); Jonas Modell, Halmstad (SE); Krister Thuresson, Halmstad (SE)

(73) Assignee: DELTA OF SWEDEN AB, Halmstad (SE)

( * ) Notice: Subject to any disclaimer, the term of this patent is extended or adjusted under 35 U.S.C. 154(b) by 193 days.

This patent is subject to a terminal disclaimer.

(21) Appl. No.: 17/130,816

(22) Filed: Dec. 22, 2020

(65) Prior Publication Data

US 2021/0189114 A1 Jun. 24, 2021

Related U.S. Application Data

(63) Continuation of application No. 16/093,857, filed as application No. PCT/EP2017/059042 on Apr. 13, 2017, now Pat. No. 10,889,711.

(30) Foreign Application Priority Data

Apr. 15, 2016 (GB) ..................... 1606649

(51) Int. Cl.
| | | |
|---|---|---|
| *C08L 29/14* | (2006.01) | |
| *A63H 33/00* | (2006.01) | |
| *B43L 19/00* | (2006.01) | |
| *C08K 5/103* | (2006.01) | |
| *C08L 31/04* | (2006.01) | |
| *C08K 5/00* | (2006.01) | |
| *C08J 9/32* | (2006.01) | |
| *C08J 9/00* | (2006.01) | |
| *C09K 3/10* | (2006.01) | |
| *C08K 5/053* | (2006.01) | |
| *C08L 83/04* | (2006.01) | |
| *B29C 67/04* | (2017.01) | |
| *C08F 16/38* | (2006.01) | |
| *C08K 3/36* | (2006.01) | |
| *C08K 3/40* | (2006.01) | |
| *C08K 7/28* | (2006.01) | |
| *C08K 13/02* | (2006.01) | |
| *B05B 12/20* | (2018.01) | |
| *B29K 25/00* | (2006.01) | |

(52) U.S. Cl.
CPC ............ *C08L 29/14* (2013.01); *A63H 33/001* (2013.01); *B29C 67/04* (2013.01); *B43L 19/0025* (2013.01); *C08F 16/38* (2013.01); *C08J 9/0023* (2013.01); *C08J 9/32* (2013.01); *C08K 3/36* (2013.01); *C08K 3/40* (2013.01); *C08K 5/0016* (2013.01); *C08K 5/053* (2013.01); *C08K 5/103* (2013.01); *C08K 7/28* (2013.01); *C08K 13/02* (2013.01); *C08L 31/04* (2013.01); *C08L 83/04* (2013.01); *C09K 3/1006* (2013.01); *B05B 12/20* (2018.02); *B29K 2025/06* (2013.01); *C08J 2331/04* (2013.01); *C08K 2201/005* (2013.01); *C08L 2205/06* (2013.01); *C08L 2205/18* (2013.01); *C08L 2205/20* (2013.01); *C09K 2200/0622* (2013.01)

(58) Field of Classification Search
CPC ...... C08L 29/14; C08L 83/04; C08L 2205/06; C08K 3/36; C08K 3/40; C08K 5/01; C08K 5/053; C08K 5/54; C08K 5/103; C08K 13/02; C08K 2201/005; A23G 4/00
See application file for complete search history.

(56) References Cited

U.S. PATENT DOCUMENTS

| | | | |
|---|---|---|---|
| 3,061,572 A * | 10/1962 | Packer ................. | C08K 5/0016 101/379 |
| 3,519,587 A | 7/1970 | Wiest et al. | |
| 3,853,797 A | 12/1974 | Pelzig | |
| 4,172,054 A | 10/1979 | Ogawa et al. | |
| 4,956,404 A | 9/1990 | Pelzig | |
| 5,173,317 A | 12/1992 | Hartman et al. | |
| 5,321,054 A | 6/1994 | Pasini | |
| 5,498,645 A | 3/1996 | Mariano et al. | |
| 6,258,412 B1 | 7/2001 | Ewing | |
| 6,444,728 B1 | 9/2002 | Yuyama | |
| 6,767,938 B1 | 7/2004 | Cordova | |
| 7,479,293 B2 | 1/2009 | Grawe et al. | |
| 7,897,659 B2 | 3/2011 | Leung | |
| 8,071,669 B2 | 12/2011 | Graewe et al. | |
| 8,993,668 B2 | 3/2015 | Cabrera | |
| 2003/0164478 A1 | 9/2003 | Fiedler et al. | |
| 2003/0236387 A1 | 12/2003 | Pavlin | |
| 2006/0014109 A1 | 1/2006 | Igawa et al. | |

(Continued)

FOREIGN PATENT DOCUMENTS

| | | |
|---|---|---|
| CN | 102690462 A | 9/2012 |
| CN | 103524926 A | 1/2014 |

(Continued)

OTHER PUBLICATIONS

PCT International Search Report and Written Opinion for corresponding PCT/EP2017/059042, dated Jul. 7, 2017.

*Primary Examiner* — Jane L Stanley

(74) *Attorney, Agent, or Firm* — Jeffrey N. Townes; Cozen O'Connor

(57) ABSTRACT

A composition comprising; a) at least one homopolymer or copolymer of vinyl acetate; and b) at least one softener.

36 Claims, No Drawings

(56) References Cited

U.S. PATENT DOCUMENTS

| | | | |
|---|---|---|---|
| 2008/0241314 A1* | 10/2008 | Hoegl | A61K 9/0058 |
| | | | 424/501 |
| 2010/0144942 A1 | 6/2010 | Kao | |
| 2011/0293777 A1 | 12/2011 | Hoegl et al. | |
| 2012/0316258 A1 | 12/2012 | You | |
| 2013/0071515 A1 | 3/2013 | Wimmer et al. | |
| 2013/0203890 A1 | 8/2013 | Lopitaux et al. | |
| 2013/0309352 A1 | 11/2013 | Wimmer et al. | |

FOREIGN PATENT DOCUMENTS

| | | |
|---|---|---|
| EP | 0176306 A2 | 4/1986 |
| GB | 1400785 | 7/1975 |
| HU | T54723 A | 3/1991 |
| JP | S53-2556 A | 1/1978 |
| JP | S56120706 A | 9/1981 |
| JP | 2004-511599 | 4/2004 |
| JP | 2013-523932 | 6/2013 |
| WO | 19980007787 A1 | 2/1998 |
| WO | 19980041408 A1 | 9/1998 |
| WO | 20060101440 A1 | 9/2006 |
| WO | 20080020800 A1 | 2/2008 |
| WO | 2011/155685 A1 | 12/2011 |
| WO | 20140177710 A1 | 11/2014 |
| WO | 2015/091743 A1 | 6/2015 |
| WO | 2015/153330 A | 10/2015 |
| WO | 20150154780 A1 | 10/2015 |

\* cited by examiner

COMPOSITION

CROSS-REFERENCE TO RELATED APPLICATIONS

This application is a Continuation of U.S. patent application Ser. No. 16/093,857, filed Oct. 15, 2018, now U.S. Pat. No. 10,889,711, which is a 371 national-stage application of International PCT Application No. PCT/EP2017/059042, filed Apr. 13, 2017, which claims priority to United Kingdom Patent Application No. 1606649.0, filed Apr. 15, 2016, all of which are incorporated herein by reference in their entirety.

The present invention relates to a polymeric composition useful as a moulding and/or modelling material, as a sealant, packaging material and/or as a binder in filled materials. In particular, the invention relates to such a composition which remains useful over a broad range of environmental conditions.

BACKGROUND TO THE INVENTION

Mouldable materials are useful in a wide variety of tasks including artistic pursuits such as in sculpting and model-making for both adults and children, in moulding and mould-making for both home and industrial uses, as fillers or sealants, as protective/packaging materials, and as masking agents to protect regions from surface treatments such as paint or etchants. A material composition may consist entirely of "binder" type materials such as polymers, softeners and other "active" materials or may comprise an inert "filler" material which serves primarily as a bulking agent. Filled materials can be obtained by providing a coating of a binder on at least one filler, where the filler is formed of particles or grains. Other suggested uses include; as an educational material, as a landscape architectonic aid, in formation of sculptures, in generating prototypes, as a material for museum interior design and aquarium decoration, as a material for industrial design, as a mould-making or impression-taking material, as a liquid-proof (sealant) layer, and/or as a filler, insulation, packing or shock-proofing material and/or fire-retardant in building construction and/or maintenance. Suitable binders may also be used as a temporary adhesive by coating onto at least a part of the surface of objects, which may then be assembled for sculpting, prototyping, model-making and similar activities by adults or children.

Some twenty years ago in WO9807787 and WO9841408 it was taught that a sand-like material can be generated where the filler is sand or a sand-like material and the binding agent can be a material or a material mixture similar to bees-wax. A disadvantage in using a binder with properties similar to beeswax is that it shows a tendency to gradually soften as temperature increases. Such a temperature increase can be obtained, for instance, when the material is manually worked with. Under such conditions the material may become too soft to retain the sculpted shape it has been formed into and/or it may be perceived sticky to hands or other surfaces. The greasiness may stain surfaces and/or clothes.

To reduce stickiness and greasiness under normal conditions, a wax with higher melting temperature can be employed as binder. Disadvantages with a higher melting temperature are that the wax is quite hard at lower temperatures. The product will typically be free-flowing and messy since it will not be cohesive under storage conditions and has to be processed or worked with for a while before it can be used and pressed together to form a body. In an attempt to realize a material composition with moderate softness suitable for direct use, and which furthermore can be hardened to obtain a permanent or semi-permanent object, WO2006101440 describes a material with a binder that has at least two solid phases—one harder and one softer. However, this technology also suffers from drawbacks such as the adherence of the binder to the plastic material which is typically used in moulds and equipment. Even more hampering in practice for the wide and general use of the material provided by this technology is that it is messy in use and is difficult to clean up due to the low cohesion of the material. Such a material would thus benefit from being more cohesive. A third essential draw-back is that the material has to be manufactured in a rather complicated and highly specialized process. The two (polymer) phases of the binder have to be mixed and applied to the surfaces of the filler particles at an elevated and rather high temperature. The mixture must then be cooled during continuous kneading. If this does not happen then the binder system demixes. Such demixing would result in a material with a texture characterized by hard entities of various sizes instead of a material resembling wet sand. In attempt to address these draw-backs a silicon-based binder system was suggested by WO2008020800 and later refined in WO2014177710.

An inherent property of silicone-based binder systems are that they have low glass transition (Tg) and melting temperatures which provides a binder which is rather stable to temperature variation in a normal temperature range (for example over 5 to 35 degrees C.). The silicone based binder system is also cohesive and sticks to itself without sticking to virtually any other surface. Although a significant improvement over previously known binder systems, the silicone-based binder systems do suffer from draw-backs.

One property, which at a first glance may appear to be an advantage—that silicone by nature tends to repel or not adhere to virtually any other surface—is a disadvantage in many technical applications. The incompatibility of the binder system with virtually any surface except silicone surfaces hampers the use as a binder system, simply because the binder fails to adhere to, and easily slips from, surfaces of filler particles. The filler particles tend to drizzle out from the matrix as the material is worked and used. This is an escalating problem as the size of the filler particles increases, possibly because it becomes harder to maintain a fully encapsulating coating. In practice, it has been found that this may also be a problem with silicon dioxide based fillers (sand) of rather small size (below 1 mm), especially if production involves humid sand or a production environment with high relative humidity. Without strict control of production conditions and methods, costly high rejection frequencies may occur due to separation of the filler and binder.

Another severe problem with the silicone based binders is that the final material properties are strongly influenced by relative humidity of the surroundings. This strongly hampers the widespread use of a material based on this technology. A material suitable for dry conditions is not useful at higher relative humidity. To exemplify, a material which has the desired texture in an environment-controlled heated and/or air-conditioned indoor climate with low relative humidity (below say 40% RH) will not be useful at high relative humidity (say above 90% RH). The minute amount of water that is absorbed by the material at higher relative humidity effectively acts as a softener for the binder, giving a texture to the material that is too soft and sticky. Often material properties are regained simply by drying the material but in some cases uptake of water may also induce demixing of the material in a way such that the filler falls out from the matrix. The latter observation may be because the binder slips from the humid filler particle surfaces.

In view of the above, it would be a great advantage to find a binder composition that is workable over a range of temperatures. It would be a further advantage to find a binder composition that was workable over a range of relative humidity of the surrounding environment. It would be a further substantial improvement if the binder composition was characterized by being compatible with surfaces of a multitude of particles of various origins. It would be a still further advantage if the binder composition and/or the resulting filled composition was not substantially sticky to surrounding surfaces such as hands and table tops. At first glance, these advantages appear to conflict, and so it would be of particular value if two or more of these advantages could be provided in a single composition. The present inventor have now surprisingly established that by providing a composition comprising a suitable polymer, softener and optionally other additives, a composition may be formed that provides at least one and preferably two or more of the foregoing advantages, as well as other advantages indicated herein below.

BRIEF SUMMARY OF THE INVENTION

In a first aspect, the present invention provides a composition comprising;
 a) at least one homopolymer or copolymer of vinyl acetate; and
 b) at least one softener;
Preferable compositions may additionally comprise certain optional components such as at least one of;
 c) at least one silicone oil and/or
 d) at least one filler.

Such compositions are highly useful as modelling compounds and thus, in a second aspect the invention further provides a modelling compound comprising at least one composition as described in any compatible embodiment herein. Other materials which may be usefully comprise or consist of compositions of the present invention include filler materials, sealant materials, masking materials, packaging materials and insulating materials. Preferably all of such materials will be mouldable by hand and/or using hand tools and will have the properties described herein for the various embodiments of the invention. These materials will each form further aspects of the present invention.

The compositions, modelling compounds and other materials of the present invention will preferably be stable to broad ranges of relative humidity (such as 0 to 100% or 10 to 90% RH) and/or broad ranges of working temperature (such as 0 to 100° C. or 0 to 40° C.). The compositions and other products will preferably also be stable to contact with liquid water and other polar fluids, such as aqueous solutions.

The modelling compounds of all embodiments of the invention are suitable for forming an impression of a solid object, such as for use as a mould or in children's play. In a further aspect, the invention thus additionally provides a method of forming an impression of an object (having an internal and/or external surface), said method comprising pressing a modelling compound, as described in any compatible embodiment herein, against at least a part of an internal and/or external surface of said object.

In a still further embodiment, the invention correspondingly provides the use of a composition of any of the embodiments described herein as a modelling compound.

It is a further desirable feature of the filled compositions of the present invention (comprising component d)) that they may be manufactured by cold-combining of a binder composition (comprising components a), b) and optionally c)) with at least one filler material (component d)). In a still further aspect, the present invention thus provides a method for the formation of a least one filled composition comprising a binder composition and at least one filler, said method comprising;
generating binder composition by mixing;
 a) at least one homopolymer or copolymer of vinyl acetate;
 b) at least one softener; and
 c) optionally at least one silicone oil;
and combining said binder composition with at least one filler material (such as any of those described herein), wherein said combining is carried out at a temperature of 0 to 50° C.

DETAILED DESCRIPTION OF THE INVENTION

The inventors have surprisingly established that mixtures based on homopolymers and/or copolymers of polyvinylacetate can provide binder compositions that fulfil two or more of the advantages on the above wish-list, preferably three or four such advantages. All or certain compositions of the invention also provide additional advantages set out herein below.

The most advantageous mixtures are characterized by at least one of the following;
 (i) being soft enough to be formed by hand or with simple hand tools;
 (ii) sticking to the surfaces of the filler particles such that the matrix robustly holds together without the material being excessively sticky to surrounding surfaces (hands, workbenches, table tops);
 (iii) being cohesive enough to prevent an extensively messy or uncontrollable material, which can readily be retrieved for re-moulding and re-use.

A further advantage of the compositions and other aspects of the present invention was also found to be that with the polyvinylacetate (PVAc) based systems of the present invention, the manufacturing process is extremely simple. The binder system can be prepared in advance and mixed cold with the filler particles at a later stage. This is in clear contrast to previously known technologies which all are characterized by an elaborate manufacturing procedures involving elevated temperatures, correct mixing orders, dried raw materials and continuous kneading.

As used herein, a "binder" or "binder system" comprises components a) and b) as described herein, plus optional component c) where present. This binder system is responsible for the key cohesive properties of the compositions and other materials of the invention and forms the key components of the compositions. Fillers and bulk materials described herein are essentially inert materials which serve as carriers or bulking agents for the binder. Evidently, the fillers and bulk materials will have an effect upon the properties of the composition, but these have a comparatively small impact on the key properties of cohesion, stability to a range of humidities and stability to a range of temperatures which provide some of the key advantages of the products of the present invention.

Polyvinylacetate has long been used for various applications in different technical fields, and vinylacetate copolymerized with other monomers has considerably expanded such uses. For instance, polyvinyl acetate is useful in adhesives and is the film-forming ingredient in many water-based (latex) paints. Combined to form copolymers with vinyl alcohol, it is used in white wood glue and with vinyl laurate it is used in improved chewing gum formulations.

The pure poly vinyl acetate has a melting point of almost 100° C. (Tg of about 40° C.), below which it is in solid form. For this reason in many applications a softener is needed. In chewing gum compositions glycerol triacetate (triacetin) has historically been used as a non-toxic additive. A clear disadvantage is that triacetin leaks from the chewing gum composition during use, and the formula loses its texture. One way to tackle this is to prepare a copolymer that has lower Tg and melting temperature. One such copolymer is vinylacetate-vinyllaurate copolymer.

Dating back to 1966, Wacker has priority for a patent for the use of copolymers of vinylacetate and vinyllaurate (U.S. Pat. No. 3,519,587A—priority 1966 Oct. 31) in adhesives for application in the form of melts. To obtain the desired properties the copolymer was melted and mixed with a wax to a few %. Such adhesives bound so strongly that they could not be removed from paper without tearing.

Wrigley Company describes in U.S. Pat. No. 5,173,317 (priority 1991 Oct. 29) chewing gum and chewing gum bases containing vinyl laurate/vinyl acetate copolymer as a primary elastomer. The application provides a gum base that has softer texture, reduced cohesion and bubble tack, and improved bubble formation. Prior to this, it had been popular to use polyvinyl acetate with glycerol triacetate sometimes together with vinyl laurate/vinyl acetate copolymer, but these had the disadvantages that glycerol triacetate tended not to be fully retained in the polymer base. Furthermore, the gum compositions had to be processed with the use of heat, which may damage the elastomer.

In patent application US2013071515 (priority 2011 Sep. 19) Wacker describes a chewing gum base which can be used for a non-tack chewing gum preparation. The gum base consists of certain ratios of polyvinylacetate and copolymer of vinyllaurate-vinylacetate, plus a softener (diacetin, triacetin, acetem, glycerol monostearate). Along the same lines, in patent application US2013309352 (priority 2012 May 15) Wacker describes a ready-made gum base for pharmaceutical chewing gum preparations. The gum base consists of polyvinylacetate, copolymer of vinyllaurate-vinylacetate, waxes or fats, plasticizers, and emulsifiers. A chewing gum containing also a pharmaceutical active ingredient is described in patent application WO2015154780 (priority 2014 Apr. 8) where Fertin Pharma teaches about a medical chewing gum consisting of polyvinyl acetate and vinyllaurate-vinylacetate copolymer, and a pharmaceutical ingredient (nicotine).

The problem that polyvinyl acetate resins have a tackiness to surrounding surfaces is discussed by Wacker and solutions are given in U.S. Pat. No. 8,071,669 (priority 2005 Mar. 3) where it is taught how to use silicon oxide (for instance talc or pyrogenic silicic acid) compounds as free-flow agents in the production of solid polyvinyl acetate resins in order to meet the surface tack of pellets due to the relatively low Tg of the polymer resins. In U.S. Pat. No. 7,479,293 (priority 2005 Feb. 17) Wacker describes that a problem with previous chewing gum bases is the difficulty to clean away from pavements (and the similar), also as previous gum bases not biodegradable and will not disappear with time. The solution in this patent is to include in the formula a photoactive filler (TiO2) which induces decomposition of organic molecules upon exposure to UV light. These two latter patents show that it by no way is obvious that PVAc systems can act as a binder and together with filler give a matrix that is non-sticky to surrounding surfaces. Even more surprising the below examples will show that certain mixtures based on PVAc systems by them self (without filler) can be obtained virtually non-sticky, yet being cohesive, such that they can be used as a toy for indoor play. In addition a binder based on the PVAc systems is not only resistant to variations in relative humidity of the surrounding environment, exposure to water can in some cases even improve final material properties.

In a first aspect, the present invention provides a composition comprising;
 a) at least one homopolymer and/or at least one copolymer of vinyl acetate; and
 b) at least one softener;

Optionally, one or more other components such as the following may be included;
 c) at least one silicone oil;
 d) at least one filler;
 e) a pigment;
 f) a glitter;
 g) a mica or coated mica;
 h) a perfume;
 i) a preservative;

Each optional component provides advantages which are useful and valuable in certain embodiments and certain applications and may be selected independently and used individually or in any combination where technically feasible. The various components are described herein separately for clarity but may be used in combination to provide desirable properties to the compositions of the invention.

The vinyl acetate homopolymer and/or copolymer component a) may consist of vinyl acetate homopolymer, may consist of vinyl acetate copolymerised with at least one other monomer or may comprise or consist of a mixture of such homopolymers and copolymers.

Typical vinyl acetate homopolymers useful in all aspects of the present invention will have an average molecular weight in the range 5 to 1000 kD, more typically 20 to 500 kD, and most preferably around 25 to 200 or 25 to 100 kD. An average molecular weight around 50 kD or around 70 kD is highly preferred.

Typical vinyl acetate copolymers useful in all aspects of the present invention will be copolymers of vinylacetate and at least one other vinyl ester. Such other vinyl esters may be any suitable vinyl ester, but examples include vinyl esters of formula $H_2C=CH-O-CO-R$, wherein R is a straight-chain, branched and/or aromatic, substituted or unsubstituted alkyl, alkenyl, ankynyl group, preferably having 2 to 24 carbons. Preferable R groups include C2 to C18 branched or straight-chain alkyl group, optionally substituted with moieties such as halides (F, Cl, Br, I), amines, amides, alcohols, esters, or ethers. Vinyl esters of medium to long-chain alkyl acids such any isomer of propanoic acid, butanoic acid, pentanoic acid, hexanoic acid, enanthic acid, Caprylic acid, pelargonic acid, capric acid, Undecylic acid, Lauric acid, Tridecylic acid, Myristic acid and mixtures thereof are highly suitable. A most preferred comonomer is vinyl laurate and vinyl acetate/vinyl laurate compolymers form a preferred constituent of component a). Component a) may thus comprise, consist essentially of or consist of at least one vinyl acetate/vinyl laurate copolymer.

Copolymers of vinylacetate and at least one other vinyl ester as described herein will generally comprise 10 to 95% vinyl acetate and 5 to 90% of at least one other vinyl ester. Preferably, this will be around 30 to 90% vinyl acetate and 10 to 70% of at least one other vinyl ester. Copolymers with a greater amount of vinyl acetate than other vinyl esters are preferred and thus the amounts may be 50 to 90% vinyl acetate and 10 to 50% of at least one other vinyl ester, such as 55 to 85% vinyl acetate and 15 to 45% of at least one other vinyl ester. Such other vinyl ester may be any indicated herein but will preferably comprise or consist of vinyl laurate.

Suitable copolymers of vinylacetate and at least one other vinyl ester for use in the present invention will typically have an average molecular weight in the range 25 to 2000 kD, more typically 50 to 1000 kD, and most preferably around 75 to 600 or 100 to 400 kD. An average molecular weight around 200 kD is highly preferred.

In all aspects of the present invention, a key component is a vinyl acetate homopolymer and/or copolymer. In some cases component a) may consist of one or more homopolymer of vinyl acetate, and in other cases component a) may consist of one or more copolymers of vinyl acetate and at least one other vinyl ester (such as those described herein). In one embodiment, component a) comprises both at least one homopolymer of vinyl acetate ("homopolymer") and at least one copolymer of vinyl acetate and at least one other vinyl ester ("copolymer). In one such an embodiment, the copolymer may be present in a lesser amount than the homopolymer. In such an embodiment, the copolymer may be present in up to 25%, up to 22% or up to 20% (e.g. 1 to 25%) of component a) with the remainder being homopolymer. In another embodiment, the copolymer may be present in a greater amount than the homopolymer. In such an embodiment, the homopolymer may, for example, be present in up to 25%, up to 22% or up to 20% (e.g. 1 to 25%) of component a) with the remainder being copolymer.

Softener component b) may be any suitable softener for the vinyl acetate homopolymer and/or copolymer. Suitable examples will generally be based on alcohols and/or other oxygen-based functionality. Mono-, di- and tri-ols of groups comprising 3 to 20 carbon atoms and the corresponding esters (e.g. with acids such as acetic acid and/or the medium to long-chain acids described above) will be typical. Examples include glycerol, glycerol esters and medium to long-chain alcohols, such as alcohols of C2 to C24 branched or straight-chain alkyl groups (mono-, di- or tri-ols of such chains, for example).

In all aspects of the present invention, the softener component b) may comprises at least one compound of formula (i)

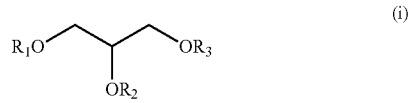

wherein each of R1 to R3 is independently selected from H; C2 to C24 branched or straight-chain acyl groups (substituted or unsubstituted); C2 to C24 saturated, or unsaturated fatty acyl groups (substituted or unsubstituted); C2 to C24 saturated, or unsaturated, mono-, di or tri-hydroxylated fatty acyl groups (unsubstituted or further substituted); and mixtures thereof.

Fatty acids are often described by reference to the number of carbon atoms and the number of unsaturations in the carbon chain. Thus, CX:Z indicates a hydrocarbon chain having X carbon atoms and Z unsaturations. Examples particularly include caproyl (C6:0), capryloyl (C8:0), capryl (C10:0), lauroyl (C12:0), myristoyl (C14:0), palmitoyl (C16:0), phytanoly (C16:0), palmitoleoyl (C16:1), stearoyl (C18:0), oleoyl (C18:1), elaidoyl (C18:1), linoleoyl (C18:2), linolenoyl (C18:3), arachidonoyl (C20:4), behenoyl (C22:0) and lignoceroyl (C24:9) groups. Fatty acyl moieties useful as substituents R1 to R3 in formula (i) include acyl groups of acids from acetic acid (C2:0) up to saturated and unsaturated long-chain fatty acids such as lignoceroyl (C24:9) groups. Groups with 2 to 22 carbons will be typical and generally no more than one of R1 to R3 will have more than 4 carbons (C4—butanoic acid).

Highly suitable acyl groups, fatty acyl groups and/or hydroxylated fatty acyl groups may be selected from acyl groups of at least one of the following acids (including mixtures thereof); acetic, propanoic, butanoic, pentanoic, hexanoic, enanthic, Caprylic, pelargonic, capric, undecylic, lauric, tridecylic, myristic, caproic, caprylic, palmitic, phytanic, palmitolic, sapienic, stearic, oleic, elaidic, vaccenic, linoleic, linoelaidic, linolenic, arachidonic, behenic, lignoceric, ricinoleic, α-linolenic and dihydroxystearic acids.

Mixtures of glycerol esters may be very suitably used including natural products and partially processed natural products such as castor oil, hydrogenated castor oil, monoglycerides of castor oil and acetates of such materials. The material identified under chemical abstract reference CAS 736150-63-3 is identified as "Glycerides, castor-oil mono-, hydrogenated, acetates" and forms one possible constituent of component b). Other specific preferred components include diacetyl glycerol and triacetyl glycerol.

Some typical compounds that may be used in softener component b) include; glycerol, diacetyl glycerol, triacetyl glycerol, castor oil monoglyceride, hydrogenated fatty acid monoglycerides, monoglyceride acetates, acetates of hydrogenated castor oil monoglycerides, monoacyl glycerols, diacyl glycerols, triacyl glycerols fatty acids, fatty acid esters, 2-Octyl-1-dodecanol, undecanol, dodecanol, C6 to C24 alkyl alcohols, and mixtures thereof.

Optional component c) is applicable to all aspects of the present invention and relates to a silicone fluid. Such a silicone fluid will generally be a linear, branched and/or cyclic oligo- or poly-alkylsiloxane with or without at least one hydroxyl termination. Poly- or oligo-dimethylsiloxane forms a preferred example, with or without at least one hydroxyl termination.

Suitable silicone fluids may have viscosities over a broad range, such as viscosity 1 to 5000 mPas at 25° C. This will preferably be around 2 to 2500 mPas at 25° C. Molecular weights of suitable oligo- or poly-alkylsiloxanes may vary from around 0.5 to around 50 kD, such as around 1 to around 30 kD.

Some examples of useful silicone fluids include CDS100 (linear polydimethylsiloxane Hydroxyterminated at both ends with a molecular weight of about 4 kD and a viscosity of about 100 mPas at 20° C.), AK5 (low molecular weight oligo dimethylsiloxane without hydroxytermination, viscosity around 5 mPas at 25° C.) and POLYMER C 2 T (linear polydimethylsiloxane, hydroxyterminated at both ends with a molecular weight of about 25000 with a viscosity of about 2000 mPas 25° C.).

In the compositions and all aspects of the present invention, component a) will typically be present in an amount of 30 to 95% by weight of components a) and b) (and c) if present). This will more typically be around 40 to 95% or 50 to 90% and most preferably around 60 to 80% by weight of components a) and b) (and c) if present).

In the compositions and all aspects of the present invention, component b) will typically be present in an amount of around 5 to 70% by weight, more typically 10 to 50% and most preferably around 20 to 40% by weight of components a) and b) (and c) if present). In one embodiment, the softener component b) will be present at greater than 15% by weight of components a) and b) (and c) if present). This may be, for example, 16 to 50% or 16 to 40%.

In the compositions and all aspects of the present invention, component c) will typically be present in an amount of around 0.1 to 20%, more typically 0.2 to 10% by weight of components a) to c). Most preferable amounts of component c) will be around 1 to 5% by weight of components a) to c). In one embodiment, component c) is present in an amount of at least 0.5% by weight of a) to c) (e.g. 0.5 to 10%).

Optional component d) may be present in all compatible aspects and embodiments of the present invention and consists of at least one filler material. Many suitable fillers are known and any of those known in the art may be utilised in the present invention.

Typical examples of filler component d) include a sand filler, a glass filler, a polymer filler, a mineral filer or mixtures thereof. Typical sand fillers include quartz sand and/or a silica sand and in the present invention, the compositions comprising components a) and b) (& optionally c)) adhere to filler particles of all sizes. Such "sand" may therefore include course sand or gravel sized particles without the binder composition demixing from the filler. Typical "sand" as indicated herein will be of average particle size 50 μm to 5 mm (e.g. 63 μm to 5 mm), preferably 95 μm to 3 mm, but sand may also encompass gravel and small pebble-size fillers of average particle sizes up to around 10 mm, which may also be used. All sizes are generally the smallest diameter. Sand fillers (and all other fillers) may be "bimodal" or "polymodal" in that more than one size of filler may be present. For example, a fine sand or silica filler with average particle size less than 100 μm may be used in combination with a course "sand" or gravel filler of particle size 1 mm or larger (e.g. 1 to 10 mm). Such a bimodal mixture of fillers allows for better coating of the larger particles and may improve the properties of the binder. Typically in such cases, the filler component will comprise at least 60% by weight of the larger size filler, preferably at least 75% by weight.

Glass fillers useful as component d) of all aspects of the present invention include crushed glass fillers, glass sphere fillers, a hollow glass sphere fillers and mixtures thereof. Average particle sizes will preferably be around 10 μm to 2 mm, although crushed glass fillers may comprise very small particles, such as down to 1 μm and smaller.

Certain mineral fillers are highly advantageous as all or a portion of component d) in all aspects of the present invention. Such mineral fillers include silica fillers, titania fillers, alumina fillers, calcium carbonate fillers, a calcium sulphate fillers, sodium sulphate fillers, silicate compounds, kaolin and other clays, calcium phosphates, talc and mixtures thereof.

Silica fillers, particularly hydrophobised silica fillers form a highly preferred mineral filler for use as at least a part of component d) of the present invention. Such fillers may be added in an amount of around 1 to 30% by weight of components a) to c) and the silica filler. When this pre-filled composition is then added to a larger quantity of another filler (see below for typical filler quantities) the silica filler has the effect of increasing the binding effect of components a) to c) without requiring more polymer, softener or silicone fluid.

Polymer fillers may include any compatible natural, semi-synthetic or synthetic polymer in any appropriate form. Synthetic polymer fillers include, for example, polystyrene, polyolefin, polyester, and/or polyamide fillers including beads, shavings, saw-dust, cut films or any other suitable particles of such materials. Preferred filler particles are beads and synthetic polymer fillers may comprises polystyrene beads, polyolefin beads, polyester beads and/or polyamide beads. Such polymer fillers may be in the form of solid pieces, or may be formed into expanded open- or closed-cell foams by methods well known in the art. Such "expanded" materials make excellent fillers, particularly where a light or insulating material is desired. Such light materials include hollow spheres of any of the polymers indicated here as well as "expanded" foamed materials including expanded polystyrene, expanded polyolefin, expanded polyester, expanded polyamide, and mixtures thereof, typically in the form of foam beads. In a particular embodiment, the filler particles are hollow polymer spheres, i.e. spherical or substantially spherical single layers of polymer surrounding a cavity. Such hollow spheres may be, for example, hollow polystyrene spheres, hollow polyolefin spheres, hollow polyester spheres, and/or hollow polyamide spheres. Other suitable hollow polymer spheres include phenolic and amino-based spheres or hollow polymer spheres made of vinylidene chloride, acrylo-nitrile or methyl methacrylate.

Polymer filler particles may vary in size from around 10 μm up to around several mm (e.g. up to around 15 mm), such as 20 μm up to around 10 mm, or 50 μm up to several mm (e.g up to around 10 mm) in diameter. In general, unexpanded or unfoamed fillers will typically be of smaller particle sizes (such as 50 μm to 1000 μm, preferably 100 μm to 500 μm) and expanded or foamed fillers will typically be of larger sizes, such as 200 μm to 10 mm, preferably 300 μm to 5 mm). Hollow polymer sphere fillers in particular may typically be in the range 10 μm-5 mm in diameter, such as 20 μm-3 mm, or 100 μm-2 mm. Other suitable size ranges for hollow polymer sphere fillers include 10 μm-500 μm, 15 μm to 250 μm, or 20 μm to 100 μm in diameter. Sizes around 25 to 75 μm are highly appropriate. As with other particle sizes indicated herein, the sizes stated typically refer to the smallest dimension, where context allows.

Polymer fillers may also comprise or consist of natural polymers such as polysaccharides including starches, chitin and cellulose, as well as other natural polymers such as polyphenols (e.g. lignin) and proteins (e.g. keratin). Polysaccharides are particularly suitable and may be in the form of, for example, flours ground from natural materials such as grains (e.g. wheat, maize, rice) or as flour, dust or chippings from wood, bamboo or other fibrous materials. Natural materials may also be "expanded" by heating to generate materials such as pop-corn, puffed wheat or crisped rice. Such materials may also be used as fillers of the present invention, either in their natural, large particles, or ground, or cut into smaller particles. Natural polymers are typically very non-toxic and safe to use and are highly useful in embodiments of the present invention which may be used by children. Sawdust and fine wood chippings, wheat, maize, wood and rice flours are preferred natural polymer fillers. Charcoal from natural sources may form both a filler material and a black colourant in the various materials of the present invention.

The total amount of filler to binder (components a) to c)) in the compositions of the present invention may vary from around 1:100 to around 200:1, corresponding to 1% to 99.5% of component d) by weight of the total composition.

In practice, there are two sub-ratios which are most likely to be used depending upon the types of filler in use and the density of that filler. For non-expanded fillers (e.g. with a density greater than 0.5 g/cm$^3$) the total amount of filler may vary from around 1:10 to around 200:1, corresponding to 10% to 99.5% of component d) by weight of the total composition. Preferably, the ratio of component d) to the total of components a) to c) (or a) and b) if c) is absent) will be 10:1 to 50:1, corresponding to 2 to 10% by weight binder and 90 to 98% by weight filler in the overall composition. For expanded fillers, (e.g. those with a density of less than 0.5 g/cm$^3$), the ratio may typically be around 1:100 to 10:1, more preferably 1:50 to 1:1. In addition to the weight ratio, it is also important to maintain a suitable volume ratio because there is a maximum volume of filler that can effectively be coated by a certain amount of binder. The volume ratio of filler to binder should therefore not be greater than around 500:1, preferably no greater than 200:1, filler volume:binder volume.

Where the composition in any aspect of the present invention comprises a silica filler, such as a hydrophobised fumed silica filler, as a part of component d), this silica filler may be present at a ratio of 10:1 to 1:50 binder (components a) to c)) to silica filler. This silica filler will then be counted as a part of component d) when calculating the filler to binder ratios discussed herein elsewhere. In one advantageous embodiment, the various products of the present invention may include both a hydrophobised fumed silica filler and a second filler of any of the types indicated herein. This provides advantages to the elasticity and robustness of the binder, especially when hydrophobised fumed silica filler is employed at a level of around 5 to 20 wt % relative to the total of that filler and components a) and b) (and where present c)). Preferred hydrophobised fumed silica fillers may comprise various particle sizes including aggregates of small particles. Typical aggregated fumed silica particles may be in the range 1 to 100 μm, preferably around 5 to 50 μm in smallest dimension.

In all aspects of the present invention, the products and compositions may comprise at least one of various optional components such as;
  e) a pigment;
  f) a glitter;
  g) a mica or coated mica;
  h) a perfume;
  i) a preservative; and/or
  j) a fire-retardant.

Examples of each of these additives are well known to the skilled worker and many are exemplified herein. In preferred embodiments, these optional components may be any of those set out in the Examples section herein and particularly in the "Table of chemicals used in the examples" which precedes the worked examples. Glitter, as referred to herein includes plastic film based glitter (e.g. polystyrene film glitter).

In one embodiment of the present invention, the compositions and other products of all aspects of the invention are not chewing gums products. As a result, the compositions and other materials may, for example, not contain any sugar or other sweetener. Similarly, the compositions may exclude natural and naturally derived gum ingredients such as polyterpene resins, gum rosin resins, wood rosins, tall oil or tall oil resins. In another embodiment, the compositions and materials of all aspects may not contain any edible oils or fats, such as triglycerides, vegetable oils, animal oils, animal fats, lecithins and/or other phospholipids. In a further embodiment, the compositions and materials of all aspects may not contain any active pharmaceutical ingredient. In addition to drug ingredients, this may also exclude other ingredients with biological activity such as probiotic bacteria, flavourants, herb or spice oils or extracts (e.g. mint oil, orange oil, menthol or citronella), sweeteners, tobacco or tobacco powder or other natural products or extracts containing any active pharmaceutical ingredient. Similarly, buffer components may be excluded. Nicotine is particularly common in chewing gum and in one embodiment, all nicotine and nicotine derivatives are excluded from the compositions of the invention. In a similar embodiment, the compositions and other products of all aspects of the invention may exclude waxes such as paraffin wax, microcrystalline wax, polyethylene wax and natural waxes such as bees' wax.

One of the primary uses of the compositions of the present invention is as modelling compositions, for sculpting and/or moulding. It is a particular advantage of the compositions of the present invention (especially over those previous compositions using a silicone based binder) that the present compositions and modelling compounds are stable to a wide range of relative humidities, to a range of working temperatures and to water and polar fluids including aqueous fluids and other materials containing a high level of water or polar solvent.

The compositions and modelling compounds of the present invention in all aspects are thus preferably stable over a humidity range of 1 to 100%, relative humidity, 10% to 90% relative humidity or 20% to 80% relative humidity.

The compositions and modelling compounds of the present invention in all aspects are also preferably stable over a temperature range of 0 to 100° C., 0 to 50° C. or 0 to 40° C. This allows that the materials may be used by children or adults in warm environments such as baths or hot-tubs and in certain embodiments the material may even be heated in boiling water or a low-temperature oven to achieve special effects such as fusion of the filler material.

The compositions and modelling compounds of the present invention in all aspects are also preferably stable to exposure to water, aqueous fluids or other polar fluids and solutions. This is particularly in the temperature range 0 to 100° C., 0 to 50° C. or 0 to 40° C. Exposure to such fluids may occur with play or modelling materials which are used to model feature including water or may allow the materials to be used in "wet" situations including in wet, outdoor conditions or in baths or hot-tubs. In building construction and maintenance, the various compositions and materials of the invention will preferably be stable to exposure to fluids and other materials containing high levels of water, such as wet concrete or wet plaster and this stability also allows for use in moulding where materials such as wet plaster will be cast. The various materials are also preferably stable to contact with other polar fluids, solutions and solvents such as ethylene glycol (antifreeze), glycerol and mixtures of these with water.

In the context of the present invention, a composition or modelling compound can be considered "stable" if no significant demixing of the filler component from the binder components (a) to c)) occurs during exposure to such conditions for at least 1 hour, preferably at least 4 hours and more preferably at least 24 hours. Significant demixing may be seen as loss of greater than 5% by weight of the filler material from the composition.

In some cases it may be desirable, when applying the binder or binder mixture to a filler, to dilute the binder/binder mixture with a suitable medium (e.g. water) to a less viscous fluid in order to facilitate mixing with the filler particles. Similarly, dilution may be useful in order to facilitate coverage of larger objects, such as the coverage of 'bulk materials' described below. The dilution referred to herein may be performed by simple dilution of a binder emulsion/dispersion with a suitable medium (e.g. water or a suitable solvent, preferably water). Where an emulsion or similar mixture is diluted, this will evidently be with a solvent miscible with the continuous phase.

In addition to generating filled materials such as those described herein above, the binder materials of the present invention (optionally with the addition of up to 20% by weight of certain fillers) may be used as a cohesive coating on surfaces such as modelling items. In particular, binder systems of components a), b) and optionally c) as described herein may be coated on at least a part of at least one surface of an item, thereby rendering the treated part of the item tacky, particularly when contacted with other surfaces so treated. Such items will typically be macroscopic in comparison with filler and polymer particles and may be, for example, greater than 5 mm in smallest dimension, preferably greater than 10 mm, and more preferably greater than 20 mm in smallest dimension. Such items are referred to herein as "bulk materials" and may be surface-coated completely or in part as described above. Where coated surfaces of two bulk materials are brought together, a temporary join will form which may aid in play or in model building, prototyping etc. The coated materials may then be separated and re-joined as required and because the cohesive coating is resistant to water, the coated material may be washed with water to at least partially removing dirt and restore the cohesive nature.

Suitable "bulk materials" for use in this aspect of the present invention may be formed of any of the materials considered above with respect to fillers including polymers (natural, or synthetic), glass, minerals, ceramics etc. Bulk materials of synthetic polymers, wood or glass are highly suitable and may be in any suitable shape including geometric shapes such as spheres, cubes, cuboids, prisms, pyramids or combinations of such shapes. Items such as wood-blocks, glass marbles, polymer ping-pong balls and similar items are highly suitable.

In this embodiment, a small amount (e.g. up to 20% by weight of components a) to d) where present) of a filler may be included in the "binder" prior to application to the surface of the bulk material. Highly suitable fillers for such embodiments include (optionally hydrophobised) silica fillers having a small particle size of 1 to 100 μm, preferably 5 to 50 μm Correspondingly, the present invention provides a method for coating at least a part of a surface of a bulk material item (as described herein), said method comprising forming a binder by mixing;
a) at least one homopolymer or copolymer of vinyl acetate;
b) at least one softener;
c) optionally at least one silicone oil, and
d) optionally up to 20% by weight of a small-particle filler.

and coating said binder on said at least part of at least one surface. The coating method may be, for example, by melting the binder materials and application at elevated temperature (e.g. 40 to 80° C.), or by dissolving the binder material in a suitable solvent, (e.g. an alcohol such as ethanol or an ester solvent such as ethyl acetate), applying the thus-generated solution to said at least partial surface and evaporating the solvent.

In addition to uses in moulding and as a play item for children (and indeed adults), the compositions of the invention find use in various other fields and these various additional uses will thus form further aspects of the present invention.

A further advantage of the compositions of the present invention is that they can be formulated by simple mixing at low temperatures. In particular, the compositions of the present invention may be formed by mixing;
a) at least one homopolymer or copolymer of vinyl acetate;
b) at least one softener; and optionally
c) at least one silicone oil, and combining said binder composition with at least one filler material, wherein said combining is carried out at a temperature of 0 to 50° C. Typically such combining will be at ambient temperature, such as between 15 and 28° C. Typically such combining will be for a period of between 10 minutes and 12 hours, preferably between 30 minutes and 4 hours.

In one further aspect, the present invention provides for the use of the various compositions described herein as a sand-substitute material, for example in bunkers for golf courses. The materials of the present invention are cohesive and thus less readily moved by wind and rain than natural sand and thus provide a more permanent alternative to regular replacement of natural sand in golfing obstacles. The consistency of the materials will furthermore be little affected by weather conditions and thus provide a consistent playing experience irrespective of the weather. Similar uses as a sand substitute will apply in children's play-pits and playgrounds where the materials of the present invention will be less prone to removal by weather and other natural processes and may be less attractive to soiling by animals than natural sand.

Correspondingly, the present invention also provides for a method of preventing or reducing the weather erosion of sand at an outdoor sand site having natural sand, such as in a golf-course bunker, sand-pit or outdoor children's play area, said method comprising replacing at least a part of the natural sand at said outdoor sand site with a composition as described herein.

Where aspects of the present invention relate to uses and methods in substituting for natural sand, it is preferred that component d) will comprise at least one sand filler (e.g. as described herein). Further, it is preferred in such aspects that the sand filler will be present in a ratio of a least 10:1 sand:total of components a) to c).

In another further aspect, the present invention provides for the use of the various compositions described herein as a cleaning product for the removal of dirt from surfaces such as painted surfaces. In particular the invention provides for the use in removal of hydrophobic materials such as oil, grease, tar, asphalt and/or bitumen from at least one painted surface, such as the painted surface of a vehicle. Such removal is typically carried out by rubbing the material of the invention onto the dirty surface, optionally following application of a surfactant to the surface.

In a corresponding aspect, the present invention provides for a method of cleaning at least one hydrophobic material from a surface (such as a painted surface), said method comprising optionally applying at least one surfactant (especially a surfactant solution in water) or lubricant to at least a portion of the surface to be cleaned, followed by rubbing the surface to be cleaned with a composition as described herein. Such rubbing may be by manual or mechanical means, such as by hand in a lump or on a cloth or sponge, or using a rotary or orbital device such as an electric polisher. Typical hydrophobic materials include, for example, oil, grease, tar, asphalt and/or bitumen Where aspects of the present invention relate to uses and methods in cleaning a hydrophobic material from a surface, the composition of the invention for such uses and methods will typically not comprise large particles of a high hardness filler such as sand, glass or mineral fillers. Where a filler is present, this will preferably be a polymeric filler (such as those described herein) and/or will be a filler with an average particle size no larger than 100 μm. Small particles of hydrophobised fumed silica are highly appropriate (e.g. 10 to 100 μm average particle size) In such aspects, the amount of filler will generally be less than 50% of the total composition weight, preferably less than 40%.

In a still further aspect, the present invention provides for the use of a composition of the present invention in filling gaps or voids, such as in the construction and/or maintenance of buildings. In many cases voids must be filled to improve heat or sound insulation or to retard the passage of fire. In such cases, the compositions of the present invention may be used as an alternative to expanding foams to fill such voids. By appropriate selection of fillers and/or additives, the compositions of the invention may be made light and highly insulating and may contain fire-retardant additives.

In a corresponding aspect, the present invention provides for a method of filling a void in construction or maintenance of a building, said method comprising adding a composition as described herein to the void. This may also be a method of filling a void to improve thermal and/or sound insulation of said building and/or to retard the passage of fire in said building.

Where an insulating effect is desired in the methods and uses of the compositions of the invention, it is preferred that component d) comprises a light-weight filler such as hollow glass or polymer spheres or expanded polymer material. Such light-weight materials contain large volumes of gasses such as air and are thus highly insulating.

In a still further aspect, the present invention provides for the use of the compositions as described herein in masking and/or protecting areas to prevent the application of paints or surface treatments to said areas. In a corresponding aspect, the present invention provides a method of preventing contact between a paint or other surface treatment and at least a portion of a surface, said method comprising applying a composition of the present invention to the said portion of surface prior to application of said paint or other surface treatment.

As used herein, the term "about", "around" "substantially" or "approximately" in relation to a number or a range of numbers will generally indicate that the number or range specified is preferred but that such a number may be varied to a certain extend without materially affecting the properties of the relevant material, composition or similar product. The skilled worker will typically be able to readily establish the extent by which such numbers may be varied without prejudicing the key advantages of the present invention. As a general guide, such numbers or the ends of such ranges may be varied by ±10%, preferably ±5% and more preferably ±1%. A corresponding meaning may be attributed to compositions "consisting essentially of" certain components, which may include up to 10%, preferably up to 5% and most preferably up to 1% of other components in addition to those specified. Where a chemical group, chain or other moiety is described herein as optionally substituted, such substitution may be absent or one or more atoms in the moiety (typically one or more hydrogens and/or carbons) may be substituted with groups such as halide (e.g. F, Cl, Br, I) groups, oxygen-based moieties such as ethers, alcohols, esters carboxylic acids or epoxides, nitrogen-based groups such as amines, amides, nitriles or nitro groups, or sulphur-based groups such as thiols, disulphides, thioesters etc. Up to around 10 such substitutions may be made where context allows, but typically 3 or few substitutions, such as 1, 2 or 3 substitutions with independently selected substituent groups will be typical.

Table of chemicals used in the examples.

| Trade name | Supplier | Characteristics |
|---|---|---|
| Vinnapas B 30 S | Wacker Chemie AG | Polyvinylacetate, Mw ca. 50 kD |
| Vinnapas B 500/20 VL | Wacker Chemie AG | Vinyllaurate-vinylacetate copolymer with 20% vinyllaurate, Mw ca. 200 kD |
| Vinnapas B 500/40 VL | Wacker Chemie AG | Vinyllaurate-vinylacetate copolymer with 40% vinyllaurate, Mw ca. 200 kD |
| Vinnapas B 60 SP | Wacker Chemie AG | Polyvinylacetate, Mw ca. 70 kD |
| Luvotix HT | Lehmann & Voss & Co | A polyamide modified derivative of castor oil to be used as a rheological additive |
| Vinnapas EAF 67 | Wacker Chemie AG | Plasticizer-free, aqueous dispersion of a copolymer formed from vinyl acetate, ethylene and acrylate monomers, with a solid content of about 60% |
| Vinnapas C305 | Wacker Chemie AG | A copolymer formed from vinyl acetate and crotonic acid, Mw ca. 50 kD. The acid number is ca. 30-38 mg KOH/g C305 |
| AK5 | Wacker Chemie AG | Silicone fluid, low viscosity |
| CDS100 | Wacker Chemie AG | Hydroxyl terminated silicone fluid |
| Glycerine (99.5%) | Aarhus-Karlshamn | CAS 56-81-5 |
| Triacetin | Chemark ApS | CAS 102-76-1 |
| Diacetin | Chemark ApS | CAS 25395-31-7 |
| Isofol 20 | Sasol | CAS 5333-42-6, 2-Octyl-1-dodecanol |
| Soft & Safe | Danisco Grindsted | CAS 736150-63-3, Glycerides, castor-oil mono-, hydrogenated, acetates |
| MCT60 | Danisco Grindsted | Glyceryl Tricaprylate-caprate |
| Stearic acid | Univar | CAS 67701-03-5 |
| Brij LT23-SO-R3 | Croda | Ethoxy (23) synthetic C12-13 alcohol |
| Dimodan MO90/D | DuPont Nutrition Biosciences ApS | CAS 91744-09-1 |
| Baskarpsand 1-3 | Sibelco | Sand grains ranges 1 mm to 3 mm |
| Silica sand M32 | Sibelco | Sand grains characterized by D50 size of 260 micrometer |
| Silica M72 | Sibelco | Grains characterized by D50 size of 310 micrometer |
| Silica sand Mam 1S | Sibelco | Grains characterized by D50 size of 225 micrometer |
| Quartz sand Mios BB 1/2.5 | Sibelco | Sand grains ranges 1 mm to 2.5 mm |
| Glass Bubbles K37 | 3M | Hollow glass sphere D50 size of 80 micrometer |
| Glass grain ST-180 | Reidt GmbH & Co. KG | Crushed glass |
| HDK® H2000 | Wacker Chemie AG | Hydrophobic, amorphous silica |
| PSI Standard Colored EPS | Polysource, Europe | Polymeric Beads |
| Expancel 461 DET 40d25 | AkzoNobel | Expanded light weight polymeric filler |

Table of chemicals used in the examples.

| Trade name | Supplier | Characteristics |
|---|---|---|
| Radglo GWT Fluorescent pigment | Radiant | Various colors |
| Microlen pigment | BASF | Various colors |
| Mearlin ® Sparkle Brass S 9222J | BASF | Coated mica flake |
| Geoshine Red (004*004*001) | Geotech International B.V. | Effect pigment |
| Geoglit Iris R/G | Geotech International B.V. | Effect pigment |
| Kuncai Pearl KC9825C | Kuncai Europe B.V. | Effect pigment |
| Probenz | Eastman Chemical B.V. | Sodium benzoate |

Each of the materials set out in the above table forms a preferred example of the corresponding component of the compositions of the invention and may be used together with or independently of any other material in any aspect of the invention.

The invention will now be further illustrated by the following non-limiting examples:

Example 1

Polyvinylacetate (PVAc) is a thermoplastic synthetic polymer resin. At room temperature it is solid without cold flow. Without added softener PVAc is too hard and stiff to be useful as a binder in materials intended for manual moulding and shaping. Vinnapas B 30 S has a glass transition temperature of ca. 40° C., and a softening point of 90° C. 30 g Vinnapas B 30 S was melted and mixed with increasing amounts triacetin (4.5 g; 9.1 g; 13.5 g; 18.5 g). At the highest addition, corresponding to 38% triacetin and 62% PVAc, it was found that the mixture was soft also at room temperature. 4 g of the PVAc/triacetin was carefully mixed with 48.5 g Sibelco Baskarpsand 1-3, and kneaded to a homogeneous material containing 7.6% PVAc/triacetin and 92.4% sand. With the same PVAc/triacetin mixture another material was prepared by in a cold mixing process mixing 4 g binder with 68.5 g sand M32, and kneaded to a homogeneous material containing 5.5% binder and 94.5% sand. It was found that the PVAc/triacetin could be used as binder for the sand and both the resulting materials had texture that allowed for convenient use in moulding and manual shaping. The materials were cohesive enough to be easily cleaned up without being excessively sticky to hands or work-tops.

Example 2

Various additives were evaluated as softeners for polyvinylacetate and polyvinyllaurate-vinylacetate copolymer. 40% wt of the tentative softener was added to the melted polymer and mixed during cooling.

| Additive | Vinnapas B 30 S | Vinnapas B 500/20 VL | Vinnapas B 500/40 VL |
|---|---|---|---|
| Triacetin | m; 5 | m; 5 | m; 5; somewhat tacky |
| Diacetin | m; 4 | m; 4 | m; 4; somewhat tacky |
| Isofol 20 | um; 0 | sm; 1 | m; 3; minor tackiness |
| Soft & Safe | sm; 3; not tacky, grainy texture | sm; 3; somewhat tacky | m; 5; very tacky |
| MCT60 | um; 0 | sm; 2; not tacky | m; 5; very tacky |
| Stearic acid | um; 0 | sm; 1; not tacky | m; 3; minor tackiness |
| Brij LT23-SO-R3 | um; 0 | sm; 1; not tacky | m; 3; minor tackiness |
| Dimodan MO90/D | um; 0 | sm; 2; not tacky | m; 4; minor tackiness | m: mixable;
sm: slightly mixable, with some liquid in equilibrium with the mixture;
um; unmixable softening effect graded on an arbitrary scale 0 to 5, where 5 is the strongest softening effect The different softeners were characterized by a varying softening effectivity and variation in the perceived tackiness of the material. Vinnapas B 500/40 VL with high vinyllaurate content is tacky already by itself in room temperature. A common result from addition of a softener is that tackiness increases. It can be noted that for some softeners the stickiness is acceptable despite the softening effect it pronounced. It was found that copolymers of PVAc were compatible with a larger range of additives than the homopolymer is. This gives opportunity to tailor the binder in more ways than for the polyvinylacetate homopolymer. Of the softeners evaluated PVAc homopolymer was mixable only with acetic esters of glycerol.

Example 3

Three compounds Dimodan MO90/D (glycerol monooleate), MCT60 (glyceryl Tricaprylate-caprate), and Isofol20 were each mixed with melted Vinnapas B500/40VL at a weight ratio of 1:1 to homogenous mixture. MCT60 appears to be the most efficient softener but the mixture is very tacky. Isofol20 has the weakest softening effect while the mixture becomes almost non-tacky, and Dimodan MO90/D gives intermediate softening to Vinnapas B500/40VL.

Example 4

Pure B 500/40 VL has a glass transition temperature of ca. 0° C., and a softening point of 85° C., which is lower than for PVAc where the corresponding numbers are 40° C. and 90° C., respectively. Although having cold flow B 500/40 VL is stiff and highly viscous at room temperature. Based on results in example 2, a binder was prepared by melting B 500/40 VL and in the melted stage mixed with other ingredients:

| | |
|---|---|
| B500/40VL | 71% |
| Isofol20 | 7.1% |
| SnS | 3.5% |
| AK5 | 2.1% |
| Stearic acid | 14.2% |
| Brij LT23-SO-R3 | 2.1% |

The mixture constitutes 71% B500/40VL polymer and has lower melting temperature and a softer texture than the pure polymer.

Example 5

The binder in Example 4 was mixed with silica sand M32. When binder added to a concentration of 2% or 4% the resulting material was either a sand material loosely held together or a sand material that was held much better together, respectively. The sample with highest binder concentration was possible to build moulds and sand-constructions with. In both materials the binder had low stickiness to surfaces (table tops) and hands, yet still higher than optimal.

Example 6

The same binder system as in Examples 4 and 5 was used at a higher concentration (29.3%) together with hollow glass spheres and a calcinated sand with coarser sand grains.

| | |
|---|---|
| Glass Bubbles K37 | 125 g |
| Silica M72 | 250 g |
| Vinnapas B500/40VL | 110 g |
| Soft & Safe | 5.5 g |
| Isofol 20 | 11 g |
| Stearic acid | 22 g |
| Brij LT23-SO-R3 | 3.3 g |
| AK5 | 3.3 g |

This gave a material with grainy, flexible and stretchy properties. The material has a density below 1 (i.e. the material floats on water). In particular the material did not degenerate in contact with water. Despite the water contact the material retained the cohesive and completely non-sticky texture.

Example 7

A binder system with about 57% polymer and 43% other components (softeners, anti-tacking agents etc.) was prepared. The binder (2.8%) was mixed with 97.2% M32-sand. Due to the lower content of polymer the binder was softer than in the previous examples.

| | |
|---|---|
| Silica sand M32 | 97.2% |
| Vinnapas B500/40VL | 1.6% |
| Soft and safe | 0.16% |
| Isofol 20 | 0.32% |
| Stearic acid | 0.65% |
| CDS100 | 0.10% |

The mixture is cohesive and works well as a sand for moulding or children's indoor play, although it is somewhat tacky to hands and table tops. The tacky properties were reduced and virtually vanished by adding Wacker AK5 silicone oil corresponding to 0.10%.

Example 8

Pure polymer is a much too hard and stiff matrix to be useful as binder or be useful as a mouldable material by itself. Many of the products in the above examples stick to surrounding surfaces. For this reason six samples were investigated in that the polymer Vinnapas 500/40VL was mixed with different softeners/anti-tack agents. Vinnapas 500/40VL was shown in Example 2 above to be compatible with a number of softening agents. Here it was found that glycerine is not useful while the tested glycerolipids (Dimodan MO90/D and MCT60) works well, as does Isofol 20.

| Additive | Ratio additive: polymer | Judged overall properties | Judged softening properties of additive (1-5) | Judged anti-tack properties of additive (1-5) |
|---|---|---|---|---|
| Glycerine | 1:1 | Does not mix with the polymer | — | — |
| Dimodan MO90/D | 1:1 | Non-tacky with a sufficient softness | 3 | 3 |
| MCT60 | 1:1 | A strong softener that in this amount gives a too soft and sticky matrix | 5 | 1 |
| Isofol 20 | 1:1 | A mediumstrong softener which in this amount gives a somewhat soft but non-sticky texture | 4 | 3 |
| CDS100 | 1:1 | Mixes with the polymer only in very small amounts. Most CDS100 forms a separate phase | 1 | 4 |
| Isofol 20 and maximum soluble amount CDS100 | 1:3 of Isofol 20 and small amount of CDS100 | A binder with good properties | 4 | 4 |

Example 9

In the examples above it was found that MCT60 is a strong softening agent for Vinnapas B 500/40 VL while it gives to sticky and tacky properties. Isofol 20 has somewhat less softening effect but gives less sticky and tacky properties, and silicon oils (for instance AK5) has virtually no softening properties but acts as a strong anti-tacking agent. Based on this the following mixture was prepared by melting and mixing the components:

| | |
|---|---|
| Vinnapas B 500/40 VL | 60 g |
| Isofol 20 | 40 g |
| MCT60 | 4 g |
| AK5 | 10 g |

This gave a matrix that by itself has a soft and stretchy texture without being tacky or sticky to hands or table tops. It can be used as a moulding material, filler or activity toy by itself.

Example 10

The material in example 9 could be mixed with various (effect) pigments and colorants to obtain various colors and optical effects of the material.

0.5 wt % of various Radglo GWT Fluorescent pigment could simply be kneaded into the material to obtain a strongly colored material. Colors tested include chartreuse (type GWT-10), green (type GWT-11), orange (type GWT-13), red (type GWT-15), pink (type GWT-17), blue (type GWT-19), and purple (type GWT-88).

0.1% of various BASF Microlene pigments could be melted (about 70-80 degrees C.) and mixed in the melted state into the matrix. Colors tested include black (type 0062MC), blue (type 6916MC), green (type 8730MC), orange (type 2910MC), pink (type 4430MC), red (type3840MC), violet (type 5700MC), and yellow (type 1500MC).

0.3% of various effect pigments could be mixed cold with the matrix. Effect pigments tested included; a coated mica flake, Mearlin® Sparkle Brass S 9222J, from BASF; Geoshine Red (004*004*001) or Geoglit Iris R/G from Geotech International B.V.; Kuncai Pearl KC9825C from Kuncai Europe B.V.

Example 11

The material in example 9 was pigmented as in example 10 but the pigment content was increased 15 times to obtain a strongly tinted binder system. 5 wt % of the resulting binder was mixed with 95% silica sand Mam 1S to obtain a material that can be used as a cohesive substitute for natural sand or children's activity toy. The resulting material was cohesive such that it is not excessively messy and such that it is suitable for indoor play, with properties resembling wet sand. Since silica sand Mam 1S is rather light (whitish) in color, the various pigmentations of the binder system results in a wide range of colored sand materials.

Example 12

The materials prepared in example 11 were kept at low (30% RH) and high (90% RH) relative humidity. Evaluating the materials after two days revealed that the material properties are unaffected by variation in the relative humidity.

Example 13

15 wt % of the binder in example 9 was mixed with 85 wt % of glass grain ST-180 to a flexible and stretchable material. This material not only resists high humidity (90% RH), it can be used for making moulds or sealing gaps under wet conditions and played with under water. Surprisingly the material's cohesive properties increases when the matrix becomes wet. The same observation was made when the material was exposed to glycerol instead of water. When kneading the material in excess glycerol the cohesive properties increases.

Example 14

The binder in example 9 was mixed with expanded PSI Standard Colored EPS to a flexible and stretchable material. Two materials were prepared with somewhat different binder content 70 wt % and 96 wt %, respectively. Both materials not only resist high humidity (90% RH), they can be used and played with in wet conditions including under water. Surprisingly the material's cohesive properties increases when the matrix becomes wet. Both cold and warm water can be used.

Two methods have been used to vary the color of the materials. Either were different colors of the EPS beads used, or alternatively was uncolored beads used and the binder was pigmented by the method described in example 10.

Example 15

10 wt % of the binder in example 9 was mixed with 90 wt % unexpanded PSI Standard Colored EPS to a flexible and stretchable material. The material not only resists high humidity (90% RH), it can be used and played with in wet conditions including under water. Surprisingly the material's cohesive properties increases when the matrix becomes wet. Both cold and warm water can be used.

Two methods have been used to vary the color of the materials. Either were different colors of the EPS beads used, or alternatively was uncolored beads used and the binder was pigmented by the method described in example 10.

Example 16

A sand based material was prepared by first preparing a binder by melting together:

| | |
|---|---|
| Vinnapas B 500/40 VL | 133 g |
| Isofol 20 | 107 g |
| MCT60 | 12 g |
| Vinnapas B 30 S | 477 g |
| Triacetin | 252 g |

The binder was then mixed cold with 17100 g quartz sand Mios BB 1/2.5 to obtain a cohesive sand based material which is non-tacky and non-sticky to hands and table tops. Unexpectedly, this example shows that this binder system can be used for large filler particles without the filler particles drizzling out from the material. At the same time the material is non-sticky to other surfaces.

Example 17

A light weight material was prepared by mixing cold 83% of the binder in example 9 with 17% of Expancel 461 DET 40d25. The material had a very low density, cohesive but yet non-sticky to hands and work-tops.

Example 18

To the material in Example 16 was added 0.8% wt HDK2000 which was mixed with the matrix by kneading cold. This corresponds to 15% wt HDK2000 in the binder. The resulting material shifted properties to be much more stretchable and long thin threads form between the sand grains when the material is stretched. The threads are very strong and long lived such that in a matrix which has been pulled apart the thin threads last for seconds to minutes without breaking.

Example 19

By examining the threads which form in Example 18 they appear slightly cloudy and opaque. This may be a result from larger aggregates of HDK2000 that act to scatter light falling through the binder. Although the mechanical properties are attractive by adding HDK2000 there is a challenge with the optical properties. This is more accentuated when an effect pigment is used in the matrix, for instance like in Example 10. HDK2000 acts to give shaded colors and loss in color and shine. The negative influence on the optical effect could be balanced by adding less HDK2000. Thus, when 2.5% wt HDK2000 was added to the binder system an addition of 0.3 wt % effect pigment gave vivid colors to the matrix. However, the positive mechanical effects by HDK2000 were not as strong as in Example 18 although still present.

Example 20

To the material in Example 9 was added 10% wt HDK2000. This addition resulted in improved stretchable mechanical properties of the matrix. The material containing HDK2000 could be stretched to very thin (much thinner than a human hair) and long self-supporting threads. Even further addition corresponding to 35% wt HDK2000 could easily be kneaded by hand and cold into the matrix. The latter addition gave a somewhat harder texture to the matrix. This could be compensated by adding another 15% wt Isofol 20. This example shows the system in Example 9 containing virtually pure binder (without filler) and 53% Vinnapas B 500/40 VL could be "diluted" with HDK2000 and more softener (Isofol 20) to a Vinnapas B 500/40 VL concentration of about 29% virtually without affecting mechanical properties.

Example 21

1.85 kg Vinnapas B 30 S was melted and mixed with 1.15 kg triacetin, corresponding to 38% triacetin and 62% PVAc. The resulting binder was soft also at ambient temperature. 100 kg sand from an outdoor sandpit was filled in a concrete mixer and the 3 kg binder was added. After about 10 minutes of mixing the material was emptied from the mixer. The material resembles wet sand and can be used to fill an outdoor sandbox for children, or used as a top layer in for instance a golf sand bunker to prevent sand erosion due to weather and wind.

Example 22

Paint shops make use of a large variation of hats and plugs of various shapes to protect areas that should not be covered with paint when performing a paint job. The flexible and stretchable material in example 14 with a binder content of 70 wt %, and 30 wt % expanded PSI Standard Colored EPS, was filled in three drilled threaded holes in a metallic plate. These holes should not be filled with or exposed to paint when the metallic plate is spray painted. The metallic plate also has four stud bolts were the treading was protected from paint by wrapping them in a matrix prepared by melting and mixing the components:

| Vinnapas B 500/40 VL | 60 g |
| Isofol 20 | 40 g |
| MCT60 | 4 g |
| HDK2000 | 30 g |

After spray painting the metallic plate the EPS filled material was removed from the three drilled threaded holes, and the HDK2000 filled material was removed from the four stud bolts. When the materials had been removed the unpainted underlying surface was exposed.

Example 23

The flexible and stretchable material in example 14 with a binder content of 70 wt %, and 30 wt % expanded PSI Standard Colored EPS, was filled to half the volume in a cardboard box with a polyethylene lining. Two 500 mL laboratory Erlenmeyer flasks were pressed into the material next to each other. The mold and hold properties of the material gave two perfectly shaped voids for the two flasks. An upper layer of the material was added on top of the flasks to completely enclose them, and the lid of the cardboard box was closed. The cardboard box was dropped to the floor from 150 cm height 10 times. The box was opened and the Erlenmeyer flasks were found to be intact. Using the same flexible and stretchable material two 500 mL laboratory round bottom flasks were packed in the cardboard box and the procedure was repeated. Also this time the two flasks were found to be intact. This example shows that the material is an excellent reusable packaging material which can be used instead of shaped Styrofoam blocks.

Example 24

A very basic formula yet providing a light-weight material with excellent stretchable, cohesive and non-tacky properties could be prepared by melting together 100 g Vinnapas B 500/40 VL with 100 g Isofol 20. The liquid binder was then mixed with 10 g expanded PSI Standard Colored EPS.

Example 25

A matrix was prepared by melting and mixing the components:

| Vinnapas B 500/40 VL | 60 g |
| Isofol 20 | 40 g |
| MCT60 | 4 g |
| HDK2000 | 30 g |

The clay like material was used to effectively remove difficult-to-remove dirt, such as asphalt, from the paint on a car body by first spraying an aqueous surfactant solution on the asphalt speckles and then rub with the clay like material. During the process the asphalt was dissolved into the clay like material.

Example 26

When a new window is mounted in a building there is normally a void space in between the wall construction and the window frame. Often this void is filled with polyurethane foam. Today polyurethane foam is sometimes questioned. The flexible and stretchable material in example 14 with a binder content of 70 wt %, and 30 wt % expanded PSI Standard Colored EPS, was squeezed in the void. Due to the mold and hold properties it filled the void perfectly and provided an insulating filling.

Example 27

Wood blocks measuring approximately 2×12×0.5 cm were coated with a thin layer of the following mixture:

| Vinnapas B 500/40 VL | 60 g |
| Isofol 20 | 40 g |
| MCT60 | 4 g |

Mixing and coating were performed at elevated temperature and a thin layer was applied with a spatula. The coating provides adhesion between the wood blocks such that it facilitates building constructions with them. The structures become semi-permanent in the way that the wood blocks can be separated from each other and re-used over and over. Since the polymer mixture is insensitive to water the wood blocks can be rinsed with water which to some degree removes dust and dirt if necessary to regenerate the original stickiness of the surface.

Example 28

A binder system was prepared by melting and mixing Vinnapas B 500/40 VL, and Isofol 20 in the following proportions

| Vinnapas B 500/40 VL | 106 g |
|---|---|
| Isofol 20 | 78 g |
| Triacetin | 12 g |
| PSI Standard Colored EPS | 15 g |

When the mixture was homogeneous and had been let to cool down the PSI Standard Colored EPS was kneaded in to the binder. The binder sticks excellent to the EPS particles. As an extra softening agent the specified amount triacetin was kneaded in to the matrix. The resulting matrix was soft, cohesive, and easy to sculpt objects in, yet being unsticky to hands and table-tops.

Example 29

A binder system was prepared by melting and mixing Vinnapas B 500/40 VL, and Isofol 20 in the following proportions

| Vinnapas B 500/40 VL | 106 g |
|---|---|
| Isofol 20 | 78 g |
| Triacetin | 12 g |
| PSI Standard Colored EPS (unexpanded) | 100 g |

When the mixture was homogeneous and had been let to cool down the unexpanded PSI Standard Colored EPS was kneaded in to the binder. The binder sticks excellent to the EPS particles. As an extra softening agent the specified amount triacetin was kneaded in to the matrix. The resulting matrix was soft, cohesive, and easy to sculpt objects with, yet being unsticky to hands and table-tops. Part of the material (ca. 10 mL) was filled in a mold that could be closed with a lid. The mold was filled with material to about 80% of the volume. The mold was boiled in water for 10 minutes and let cool to room temperature before the lid of the mold was opened. It was found that the EPS particles had expended, filled the mold, and sintered together to one body with the shape of the inner surface of the mold.

Example 30

Table tennis balls were coated with a thin layer of the following mixture:

| Vinnapas B 500/40 VL | 60 g |
|---|---|
| Isofol 20 | 40 g |
| MCT60 | 4 g |

Mixing was performed at elevated temperature. A thin layer of the mixture could be applied to the table tennis balls by dissolving the mixture 1:1 in ethanol and dipping/contacting them with the resulting liquid. The ethanol was let to evaporate leaving a coating which provides adhesion between the table tennis balls such that it facilitates building constructions with them. The structures become semi-permanent in the way that the table tennis balls can be separated from each other and re-used over and over. Since the polymer mixture is insensitive to water the table tennis balls can be rinsed with water which to some degree removes dust and dirt if necessary to regenerate the original cohesiveness of the surface.

Example 31

First, 60 g Vinnapas B 500/40 VL, 40 g Isofol 20, and 4 g MCT60 were mixed at elevated temperature (80-100° C.). Second, 7.5 g Vinnapas B 60 SP was mixed with 4 g Triacetin at 130° C. After cooling to room temperature the two solutions were mixed to obtain a polymeric composition useful as a moulding and/or modelling material resembling "Slime". Immediately after mixing the texture was grainy but after some additional mixing and kneading by hand a homogeneous polymer solution was obtained. The resulting mixture flows but has high viscosity. It has a texture that is stretchy and easy to work with yet being unsticky to hands and surfaces such as table-tops. The B 60 SP polymer renders slight elasticity to the solution which may be a preferred way to provide reduced stickiness to hands of the user if greasiness of other non-stick agents is undesired.

Example 32

First, 60 g Vinnapas B 500/40 VL, 40 g Isofol 20, 4 g MCT60, and 16 g Luvotix HT were mixed at elevated temperature (80-100° C.). After cooling the resulting polymeric composition is useful as a moulding and/or modelling material and could be stretched to very thin and long self-supporting threads.

Example 33

5 g of the material in Example 32 was used as binder and showed excellent adhesion to 20 g PSI Standard Colored EPS polymeric beads, 10 mm in diameter. After careful mixing a non-sagging "pick and place" material was obtained where individual polymer beads can be removed and repositioned. This behavior facilitates building constructions with them. The structures become semi-permanent in the way that the EPS polymeric beads can be separated from each other and re-used over and over.

Example 34

While being perfect for "pick and place" the material in Example 33 has suboptimal molding properties due to a rather high firmness of the binder in combination with a rather low binder content. A softer binder texture, yet non-tacky, was obtained by adding 1 g Wacker AK5 silicone fluid to 9 g of the material in Example 32. The AK5 renders softness and at the same time reduced tackiness. A moldable non-tacky creative material was obtained after mixing this binder system 1:1 with PSI Standard Colored EPS polymeric beads, 3 mm in diameter.

Example 35

First, 60 g Vinnapas B 500/40 VL, 40 g Isofol 20, and 4 g MCT60 were mixed at elevated temperature. Second, also at an elevated temperature 30 g Vinnapas C 305 was mixed with 16 g Triacetin. After cooling to about 45 C the C305/triacetin was contacted with 6 g water containing one drop ammonia solution (5%). Ammonia helps charging the polymer and a sticky polymer mix forms when the water is absorbed. The first and second polymer solutions are mixed and later soaked with additional water. The final water content in the mixture is about 15%. The example shows that a mixture containing both polar and unipolar domains can be created. The water content provides a non-tacky and a "wet and cold" feeling to the hands. The final material has similarities in behavior to "Slime".

Example 36

First, 60 g Vinnapas B 500/40 VL, 40 g Isofol 20, and 4 g MCT60 were mixed at elevated temperature. Second, also at an elevated temperature 30 g Vinnapas C 305 was mixed with 16 g Triacetin. After cooling to about 45 C the C305/triacetin was contacted with 6 g water containing one drop ammonia solution (5%). Ammonia helps charging the polymer and a sticky polymer mix forms when the water is absorbed. The first and second polymer solutions are mixed and later soaked with an aqueous solution of Probenz (30%). The final water content in the mixture is about 15%. The example shows that the polar domains provides a convenient way to load the matrix with a water soluble compound (in this case a preservative). The water content provides a non-tacky and a "wet and cold" feeling to the hands. The final material has similarities in behavior to "Slime".

Example 37

To reduce viscosity of the dispersion 8 g of Vinnapas EAF 67 from Wacker was diluted with 4.5 g water to a dry content of about 40%. The resulting 12.5 g dispersion was added to 20 g PSI Standard Colored EPS polymeric beads, 10 mm in diameter, and mixed carefully. After drying a pick and place" material was obtained. The vinyl acetate, ethylene and acrylate copolymer formed a tacky film on the surfaces of the beads. Once formed the surface film was not affected by water and if necessary the beads could to some extent be cleaned to at least partially removing dirt and restore the cohesive nature.

Example 38

To reduce viscosity of the dispersion 80 g of Vinnapas EAF 67 from Wacker was diluted with 20 g water. Wood blocks measuring approximately 2×12×0.5 cm were dipped into the dispersion twice and let drying for 60 minutes after each dipping. The vinyl acetate, ethylene and acrylate copolymer formed a tacky film on the surfaces of the wood blocks. The film provides adhesion between the wood blocks such that it facilitates building constructions with them. The structures become semi-permanent in the way that the wood blocks can be separated from each other and re-used over and over. Since the polymer mixture is insensitive to water the wood blocks can be rinsed with water which to some degree removes dust and dirt if necessary to regenerate the original stickiness of the surface.

Example 39

First, 60 g Vinnapas B 500/40 VL, 40 g Isofol 20, and 4 g MCT60 were mixed at a temperature of about 80-100° C. Second, also at a temperature of about 80-100° C., 30 g Vinnapas C 305 was mixed with 16 g Triacetin. After cooling to about 45° C. the C305/triacetin was contacted with 6 g water containing three drop ammonia solution (5%). Ammonia helps to charge the polymer and a sticky polymer mix forms when the water is absorbed. The first and second polymer solutions are mixed and later soaked with water to a water content of about 15%. The polymer solution is used as binder (90 wt %) and mixed with Expancel 461 DET 40d25 from Akzo Nobel (10 wt %). The water content results in a creative material with a "wet and cold" feeling to the hands which vanishes when the water evaporates. This example shows that incorporation of water in the binder provides a material that changes properties upon drying.

REFERENCES

WO9807787 1996 Aug. 23
WO9841408 1997 Mar. 17
WO2006101440 2005 Mar. 23
WO2008020800 2006 Aug. 17
WO2014177710 2013 May 3
U.S. Pat. No. 3,519,587A 1966 Oct. 31
U.S. Pat. No. 5,173,317 1991 Oct. 29
US2013071515 2011 Sep. 19
US2013309352 priority 2012 May 15
WO2015154780 priority 2014 Apr. 8
U.S. Pat. No. 8,071,669 priority 2005 Mar. 3
U.S. Pat. No. 7,479,293 priority 2005 Feb. 17

The invention claimed is:
1. A modelling compound comprising at least one composition, wherein said composition comprises:
   a) at least one homopolymer and/or copolymer of vinyl acetate;
   b) at least one softener; and
   d) at least one filler
   wherein said softener b) consists of a $C_6$ to $C_{24}$ alkyl alcohol, a fatty acid, a fatty acid ester, and/or at least one compound of formula (i)

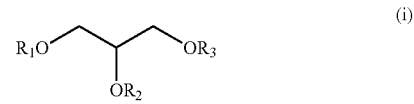

wherein each of $R_1$ to $R_3$ is independently selected from the group consisting of H, $C_2$ to $C_{22}$ branched or straight-chain acyl groups, $C_2$ to $C_{22}$ saturated, or unsaturated fatty acyl groups, $C_2$ to $C_{22}$ saturated or unsaturated, mono-, di- or tri-hydroxylated fatty acyl groups, and mixtures thereof; and
   wherein b) is present in an amount ranging from 31 to 70% by weight of components a) and b).

2. The modelling compound as claimed in claim 1, wherein b) is present in an amount ranging from 38 to 70% by weight of components a) and b).

3. The modelling compound as claimed in claim 1, wherein said filler is a non-expanded filler present in an amount ranging from 22 to 99.5% by weight of the total composition.

4. The modelling compound as claimed in claim 1, wherein said filler is a non-expanded filler present in an amount ranging from 34 to 99.5% by weight of the total composition.

5. The modelling compound as claimed in claim 1, wherein said filler is a non-expanded filler present in an amount ranging from 35 to 99.5% by weight of the total composition.

6. The modelling compound as claimed in claim 1, wherein said filler is a non-expanded filler present in an amount ranging from 85 to 99.5% by weight of the total composition.

7. The modelling compound as claimed in claim 1 further comprising:
   c) at least one silicone oil.

8. The modelling compound of claim 7, wherein component c) is present in an amount ranging from 0.2 to 10% by weight of components a) to c).

9. The modelling compound of claim 8, wherein component c) is a silicone fluid having a viscosity of 1 to 5000 mPas at 25° C. or a hydroxyl-terminated silicone fluid having a viscosity of 1 to 5000 mPas at 25° C.

10. The modelling compound of claim 1, wherein said at least one homopolymer or copolymer of vinyl acetate is a polyvinylacetate homopolymer.

11. The modelling compound of claim 1, wherein said at least one homopolymer or copolymer of vinyl acetate is a copolymer of vinyl acetate and at least one other vinyl ester.

12. The modelling compound of claim 11, wherein said other vinyl ester is a compound of the formula $H_2C=CH-O-CO-R$, wherein R is a $C_2$ to $C_{18}$ branched or straight-chain alkyl group.

13. The modelling compound of claim 11, wherein said other vinyl ester is a vinyl ester of at least one acid selected from the group consisting of propanoic acid, butanoic acid, pentanoic acid, hexanoic acid, enanthic acid, caprylic acid, pelargonic acid, capric acid, undecylic acid, lauric acid, tridecylic acid, myristic acid and mixtures thereof.

14. The modelling compound of claim 11, wherein said copolymer is a copolymer of vinyl acetate and vinyl laurate.

15. The modelling compound of claim 1, wherein said softener comprises at least one glycerol ester.

16. The modelling compound of claim 1, wherein in formula (i) said acyl group, fatty acyl groups and/or hydroxylated fatty acyl group is selected from acyl groups of at least one of the following acids: acetic, propanoic, butanoic, pentanoic, hexanoic, enanthic, pelargonic, capric, undecylic, lauric, tridecylic, myristic, caproic, caprylic, palmitic, phytanic, palmitolic, sapienic, stearic, oleic, elaidic, vaccenic, linoleic, linoelaidic, linolenic, arachidonic, behenic, lignoceric, ricinoleic, α-linolenic and dihydroxystearic.

17. The modelling compound of claim 1, wherein said softener is at least one selected from the group consisting of: glycerol, diacetyl glycerol, triacetyl glycerol, castor oil monoglyceride, hydrogenated fatty acid monoglycerides, monoglyceride acetates, acetates of hydrogenated castor oil monoglycerides, monoacyl glycerols, diacyl glycerols, triacyl glycerols fatty acids, fatty acid esters, $C_6$ to $C_{24}$ alkyl alcohols, and mixtures thereof.

18. The modelling compound of claim 1, wherein component a) is present in an amount ranging from 30 to 95% by weight of components a) and b).

19. The modelling compound of claim 1, wherein component a) is present in an amount ranging from 50 to 90% by weight of components a) and b).

20. The modelling compound as claimed in claim 1, wherein component d) comprises a sand filler, a glass filler, a polymer filler, a mineral filler, or mixtures thereof.

21. The modelling compound of claim 20, wherein said sand filler is a quartz sand and/or a silica sand, having an average particle size of 100 μm to 5 mm.

22. The modelling compound of claim 20, wherein said glass filler is a crushed glass filler, a glass sphere filler, a hollow glass sphere filler, or mixtures thereof, having an average particle size of 100 μm to 2 mm.

23. The modelling compound of claim 20, wherein said mineral filler is a silica filler, a titania filler, an alumina filler, a calcium carbonate filler, a calcium sulphate filler, or mixtures thereof.

24. The modelling compound of claim 23, wherein said silica filler is a hydrophobised fumed silica filler.

25. The modelling compound of claim 20, wherein said polymer filler comprises polystyrene beads, polyolefin beads, polyester beads, polyamide beads, expanded polystyrene beads, expanded polyolefin beads, expanded polyester beads, expanded polyamide beads, hollow polymer spheres, or mixtures thereof.

26. The modelling compound of claim 20, wherein the said polymer filler comprises hollow polymer spheres having an average particle size of 10 μm to 5 mm.

27. The modelling compound of claim 1, wherein said filler is selected from the group consisting of a sand filler, a glass filler, a polymer filler, and mixtures thereof; and wherein said polymer filler is a polystyrene, polyolefin, polyester, and/or polyamide filler.

28. The modelling compound of claim 1, further comprising at least one component selected from the group consisting of:
 e) a pigment;
 f) a glitter;
 g) a mica or coated mica;
 h) a perfume; and
 i) a preservative.

29. A filler material, sealant material, masking material, packaging material and/or insulating material comprising at least one modelling compound as claimed in claim 1.

30. The modelling compound of claim 1, wherein said compound is stable over a humidity range of 10% to 90% relative humidity.

31. The modelling compound of claim 1, wherein said compound is stable when exposed to water.

32. A method of forming an impression of an object, said method comprising pressing a modelling compound of claim 1 against at least a part of the internal and/or external surface of said object, to form an impression of the object.

33. A modelling compound comprising at least one composition, wherein said composition comprises:
 a) at least one homopolymer and/or copolymer of vinyl acetate;
 b) at least one softener; and
 d) at least one filler
 wherein said softener consists of a $C_6$ to $C_{24}$ alkyl alcohol, a fatty acid, a fatty acid ester, and/or at least one compound of formula (i)

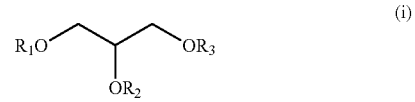

(i)

wherein each of $R_1$ to $R_3$ is independently selected from the group consisting of H, $C_2$ to $C_{22}$ branched or straight-chain acyl groups, $C_2$ to $C_{22}$ saturated, or unsaturated fatty acyl groups, $C_2$ to $C_{22}$ saturated or unsaturated, mono-, di- or tri-hydroxylated fatty acyl groups, and mixtures thereof; and
 wherein said filler is a non-expanded filler present in an amount ranging from 85-99.5 wt % by weight of the total composition.

34. The modelling compound of claim 33, wherein component b) is present in an amount ranging from 10 to 70% by weight of components a) and b).

35. The modelling compound of claim 33, wherein component b) is present in an amount ranging from 10 to 50% by weight of components a) and b).

36. A method for the formation of a filled composition comprising a binder composition and at least one filler, said method comprising:
 generating a binder composition by mixing:
  a) at least one homopolymer and/or copolymer of vinyl acetate;

b) at least one softener wherein said softener consists of a $C_6$ to $C_{24}$ alkyl alcohol, a fatty acid, a fatty acid ester, or at least one compound of formula (i)

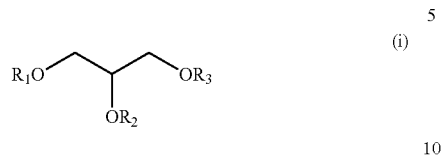

(i)

wherein each of $R_1$ to $R_3$ is independently selected from the group consisting of H, $C_2$ to $C_{22}$ branched or straight-chain acyl groups, $C_2$ to $C_{22}$ saturated, or unsaturated fatty acyl groups, $C_2$ to $C_{22}$ saturated or unsaturated, mono-, di- or tri-hydroxylated fatty acyl groups, and mixtures thereof; and wherein b) is present in an amount ranging from 31 to 70% by weight of components a) and b); and c) optionally, at least one silicone oil; and combining said binder composition with at least one filler material, wherein said combining is carried out at a temperature of 0 to 50° C.

\* \* \* \* \*